United States Patent
Kang

(10) Patent No.: US 12,308,563 B2
(45) Date of Patent: May 20, 2025

(54) CONNECTOR MODULE, BATTERY PACK COMPRISING SAME, VEHICLE, AND CONNECTOR ASSEMBLY

(71) Applicant: LG Energy Solution, Ltd., Seoul (KR)

(72) Inventor: Choon-Kwon Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 566 days.

(21) Appl. No.: 17/642,860

(22) PCT Filed: Feb. 1, 2021

(86) PCT No.: PCT/KR2021/001301
§ 371 (c)(1),
(2) Date: Mar. 14, 2022

(87) PCT Pub. No.: WO2021/167266
PCT Pub. Date: Aug. 26, 2021

(65) Prior Publication Data
US 2022/0393394 A1   Dec. 8, 2022

(30) Foreign Application Priority Data
Feb. 19, 2020 (KR) .................. 10-2020-0020560

(51) Int. Cl.
*H01R 12/91* (2011.01)
*H01M 10/42* (2006.01)
(Continued)

(52) U.S. Cl.
CPC ...... *H01R 13/6205* (2013.01); *H01M 10/425* (2013.01); *H01M 50/204* (2021.01);
(Continued)

(58) Field of Classification Search
None
See application file for complete search history.

(56) References Cited

U.S. PATENT DOCUMENTS 9,680,252 B2 * 6/2017 Hashiguchi ........ H01R 13/6205
9,735,519 B2   8/2017 Yi et al.
(Continued)

FOREIGN PATENT DOCUMENTS

CN   110401069 A   11/2019
EP   3514889 A1    7/2019
(Continued)

OTHER PUBLICATIONS

Extended European Search Report issued in corresponding European Patent Application No. 21756238.8 dated Oct. 27, 2021.
(Continued)

*Primary Examiner* — Felix O Figueroa
(74) *Attorney, Agent, or Firm* — Morgan, Lewis & Bockius LLP

(57) ABSTRACT

The present disclosure discloses a connector module with improved convenience in use and durability. The connector module has at least one receptacle and a receiving groove having an inner space, is configured to be connected to an external connector module provided in an external device, and is provided in an internal device. The connector module includes at least one plug configured to be coupled to the receptacle for electrical connection with the receptacle, a coupler including a coupling guide rib, which extends toward the external connector module, inserted into the receiving groove when the external connector module is connected to the connector module, and is configured to guide a coupling position of the connector module, and a fastener coupled to the coupler such that the coupler moves in a predetermined distance range and configured such that a portion of the fastener is fixed to the internal device.

8 Claims, 11 Drawing Sheets

(51) Int. Cl.
  *H01M 50/204*    (2021.01)
  *H01R 13/62*     (2006.01)
  *H01R 13/631*    (2006.01)
  *H01R 13/639*    (2006.01)
  *H01R 24/40*     (2011.01)

(52) U.S. Cl.
  CPC ........... *H01R 12/91* (2013.01); *H01R 13/631* (2013.01); *H01R 13/6315* (2013.01); *H01R 13/639* (2013.01); *H01R 24/40* (2013.01); *H01M 2010/4271* (2013.01); *H01R 2201/26* (2013.01)

(56) References Cited

U.S. PATENT DOCUMENTS

| | | | |
|---|---|---|---|
| 9,966,699 | B1 | 5/2018 | Liu et al. |
| 10,627,863 | B2 * | 4/2020 | Shaw .................... H01F 7/0205 |
| 2004/0077197 | A1 | 4/2004 | Nishide |
| 2016/0181728 | A1 | 6/2016 | Hashiguchi |
| 2017/0194739 | A1 | 7/2017 | Park et al. |
| 2018/0277991 | A1 | 9/2018 | Endo |
| 2019/0192294 | A1 | 7/2019 | Miller |

FOREIGN PATENT DOCUMENTS

| | | | |
|---|---|---|---|
| JP | 3040107 | U | 8/1997 |
| JP | 2004-214105 | A | 7/2004 |
| JP | 2005-209532 | A | 8/2005 |
| JP | 2014-154364 | A | 8/2014 |
| JP | 2016-119157 | A | 6/2016 |
| KR | 1078214 | B1 | 11/2011 |
| KR | 10-2017-0071968 | A | 6/2017 |
| KR | 10-2017-0079637 | A | 7/2017 |
| KR | 10-2018-0040687 | A | 4/2018 |
| KR | 10-2018-0123993 | A | 11/2018 |
| KR | 10-2019-0049639 | A | 5/2019 |
| KR | 10-2019-0071409 | A | 6/2019 |
| WO | 2019/130880 | A1 | 12/2020 |

OTHER PUBLICATIONS

International Search Report and Written Opinion (with partial translation) issued in corresponding International Patent Application No. PCT/KR2021/001301 dated May 20, 2021.

First Office Action issued in corresponding Japanese Patent Application No. 2022-503968 dated Jan. 23, 2023. Note: JP 2016-119157 cited therein is already of record.

* cited by examiner

CONNECTOR MODULE, BATTERY PACK COMPRISING SAME, VEHICLE, AND CONNECTOR ASSEMBLY

TECHNICAL FIELD

The present disclosure relates to a connector module, a battery pack comprising the same, a vehicle and a connector assembly, and more particularly, to a connector module with improved convenience in use and durability.

The present application claims the benefit of Korean Patent Application No. 10-2020-0020560 filed on Feb. 19, 2020 with the Korean Intellectual Property Office, the disclosure of which is incorporated herein by reference in its entirety.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory, effect, and thus they are gaining more attention than nickel-based secondary batteries for their advantages that recharging can be done whenever it is convenient, the self-discharge rate is very low and the energy density is high.

A lithium secondary battery primarily uses a lithium-based oxide and a carbon material for a positive electrode active material and a negative electrode active material respectively. Additionally, the lithium secondary battery includes an electrode assembly including a positive electrode plate and a negative electrode plate respectively coated with the positive electrode active material and the negative electrode active material and a separator interposed between the positive electrode plate and the negative electrode plate, and a cylindrical battery case or a packaging in which the electrode assembly is received together with an electrolyte solution in an airtight manner.

Recently, secondary batteries are being widely used in not only small devices such as portable electronic products but also medium- and large-scale devices such as vehicles and energy storage systems (ESSs). For use in medium- and large-scale devices, many secondary batteries are electrically connected to increase the capacity and output.

More recently, with the use as a source of energy and the growing need for high capacity structures, there is an increasing demand for a battery pack including a plurality of secondary batteries electrically connected in series and/or in parallel, a module case for storing the secondary batteries, and a battery management system (BMS).

Additionally, in addition to the module case, the battery pack generally further includes a metal external housing to protect the plurality of secondary batteries from external impacts or receive and store the plurality of secondary batteries. Additionally, the external housing may include a connector module for electrical connection with an external device. That is, the connector module may be configured to transmit the power from the battery pack to the external device or receive power from the external device for the purpose of charging. Additionally, the connector module may be used to transmit condition information of the battery pack to the external device. In general, the connector module is electrically connected to a connector module of the external device by male-female coupling.

In this instance, for male-female coupling of the two connector modules, it is necessary to place them in the exact position for male-female structure matching. However, it is very difficult for a user himself/herself to precisely match the connector module provided in the battery pack and the connector module of the external device. That is, when even a small distance error between the two connector modules occurs, in many cases, the two connector modules do not precisely match, and collide frequently. Accordingly, in the repetitive connection process, the connector module is damaged, a connection failure occurs in the battery module or the external device or frequent repair is needed, causing life reduction and user inconvenience.

DISCLOSURE

Technical Problem

The present disclosure is designed to solve the above-described problem, and therefore the present disclosure is directed to providing a connector module with improved convenience in use and durability.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, a connector module according to the present disclosure has at least one receptacle and a receiving groove having an inner space of a predetermined depth, and is configured to be connected to an external connector module provided in an external device and is provided in an internal device, and the connector module includes at least one plug configured to be coupled to the receptacle for electrical connection with the receptacle, a coupling part including a coupling guide rib, wherein the coupling guide rib extends toward the external connector module, is inserted into the receiving groove when the external connector module is connected to the connector module, and is configured to guide a coupling position of the connector module, and a fastening part coupled to the coupling part such that the coupling part moves in a predetermined distance range and configured such that a portion of the fastening part is fixed to the internal device.

Additionally, the connector module may include a block part which horizontally extends from the plug and the coupling part, and the fastening part may include a mounting hole through which the plug is inserted and passes, and an insertion groove formed in the mounting hole, wherein a portion of the block part is inserted into the insertion groove, and the insertion groove has a clearance allowed for the block part to move in the predetermined distance range.

Further, the block part may have a movement protrusion which extends outwardly, and the fastening part may have a guide hole configured to allow the movement protrusion to horizontally move when the movement protrusion is inserted into the guide hole.

Additionally, the connector module may include a first magnet disposed at a portion of the block part, and a second magnet configured to attract the first magnet to move the coupling guide rib to an exact position and disposed at a portion of the fastening part.

Further, the connector module may further include a third magnet disposed at a horizontal end of the block part, and a fourth magnet disposed at the insertion groove of the fastening part to act a pushing force on the third magnet.

Additionally, the connector module may include a connection guide rib which extends in a coupling direction to guide the insertion of the at least one plug into an exact position when the at least one plug is connected to the receptacle.

Further, the at least one plug may include at least one pin connected with a coaxial cable, and a plug housing in which the pin is received, the receptacle may include at least one terminal connected with another coaxial cable, and a receptacle housing in which the terminal is received, and the external connector module may include a fitting groove having an internal structure corresponding to the plug housing to allow a portion of the plug housing to be inserted.

Further, to achieve the above-described object, a battery pack according to the present disclosure includes the connector module, a battery management system electrically connected to the connector module, a plurality of secondary batteries, and a pack case configured to receive the plurality of secondary batteries therein.

Additionally, to achieve the above-described object, a vehicle according to the present disclosure includes the battery pack, and a mounting part having a receiving space in which the battery pack is inserted and received, wherein the connector module is provided in the receiving space, and the external connector module is provided at an end of the pack case in an insertion direction of the battery pack.

Additionally, to achieve the above-described object, a connector assembly according to the present disclosure includes an external connector module provided in an external device, and an internal connector module provided in an internal device and configured to be connected to the external connector module, wherein the internal connector module includes at least one plug configured to be coupled to a receptacle for electrical connection with the receptacle, a coupling part including a coupling guide rib which extends to guide the movement of the internal connector module to an exact position for coupling with the external connector module when the internal connector module is connected to the external connector module, and a fastening part coupled to the coupling part such that the coupling part moves in a predetermined distance range and configured such that a portion of the fastening part is fixed to a panel of the external device, and the external connector module includes the at least one receptacle coupled to the at least one plug respectively, and a receiving groove having a shape corresponding to the coupling guide rib, wherein the coupling guide rib is received in a manner that the receiving groove is inserted.

Advantageous Effects

According to an aspect of the present disclosure, the present disclosure includes the fastening part coupled to the coupling part such that the coupling part can move in the predetermined distance range and configured such that a portion of the fastening part is fixed to the internal device, thereby preventing damage that occurs to the connector module, the internal device, or the external device when the connector module is not placed in the exact position for smooth coupling during the assembly of the connector modules.

Additionally, according to an aspect of an embodiment of the present disclosure, the present disclosure includes the block part having the movement protrusion extending outwardly, and the guide hole configured to allow the movement protrusion to horizontally move when the movement protrusion is inserted into the fastening part, thereby precisely limiting the movement range in which the block part moves in two directions. Accordingly, the present disclosure may prevent damage that occurs to the connector module, the internal device, or the external device when the connector module is not placed in the exact position for smooth coupling during the assembly of the connector modules.

Additionally, according to another aspect of the present disclosure, the connector module of the present disclosure includes the first magnet provided in a portion of the block part, and the second magnet configured to attract the first magnet to move the coupling guide rib to the exact position and disposed at a portion of the fastening part, thereby moving the coupling guide rib to the exact position in a straightforward manner by a force of attraction between the first magnet and the second magnet. That is, when the coupling guide rib deviates from the exact position perpendicular to the central axis of the receiving groove, the coupling guide rib collides with the outer periphery of the receiving groove, and the block part may be moved by the collision force and the coupling guide rib may be temporarily fixed to the exact position by the force of attraction between the first magnet and the second magnet.

BRIEF DESCRIPTION OF THE DRAWINGS

The accompanying drawings illustrate preferred embodiments of the present disclosure, and together with the following detailed description, serve to provide a further understanding of the technical aspect of the present disclosure. However, the present disclosure should not be construed as being limited to the drawings.

DETAILED DESCRIPTION

Figure 1:
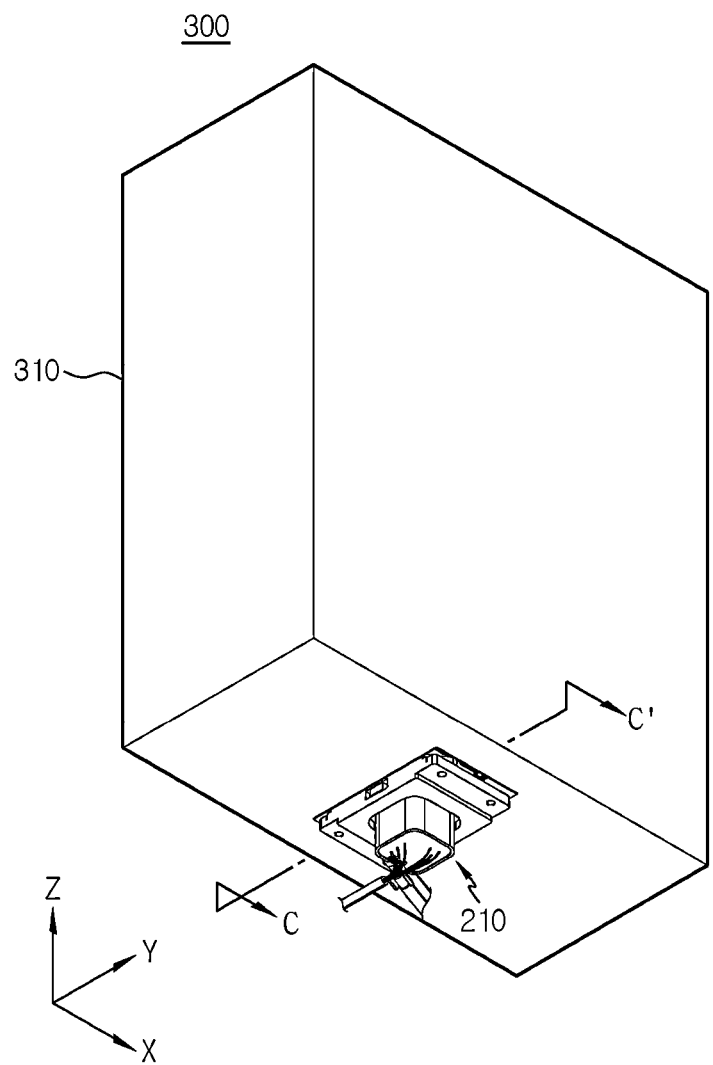
FIG. 1 is a schematic bottom perspective view of an external connector module and a battery pack according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
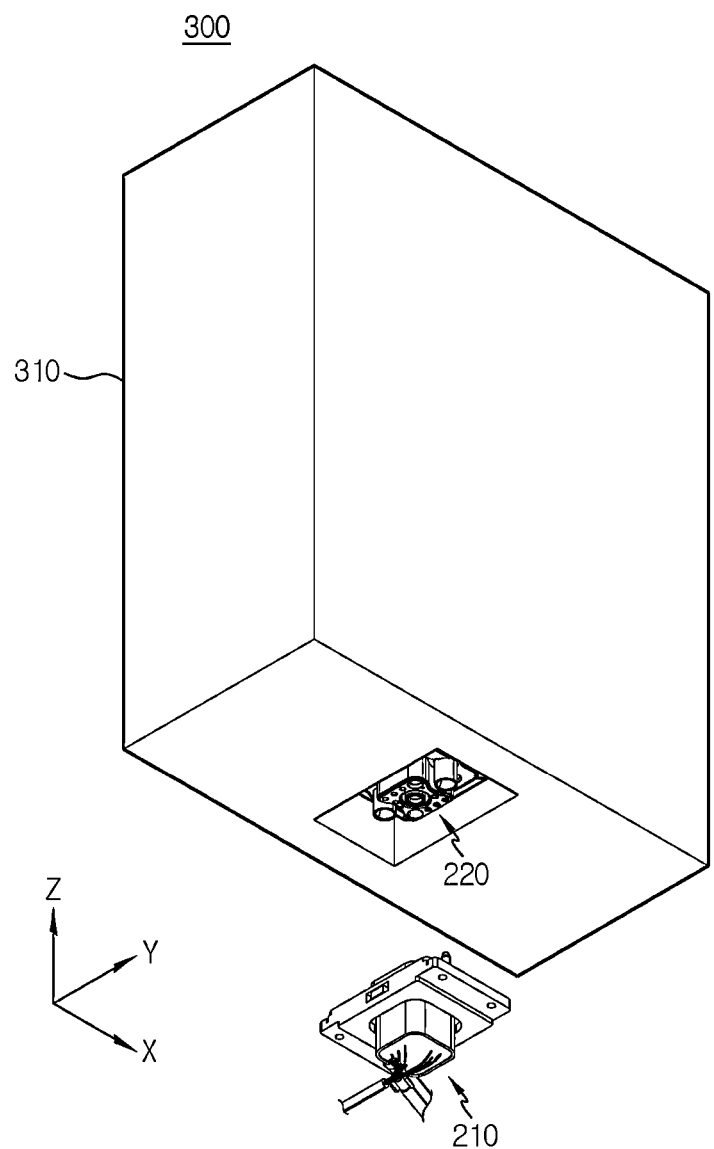
FIG. 2 is a schematic exploded perspective view of a connector module and a battery pack according to an embodiment of the present disclosure.
Figure 3:
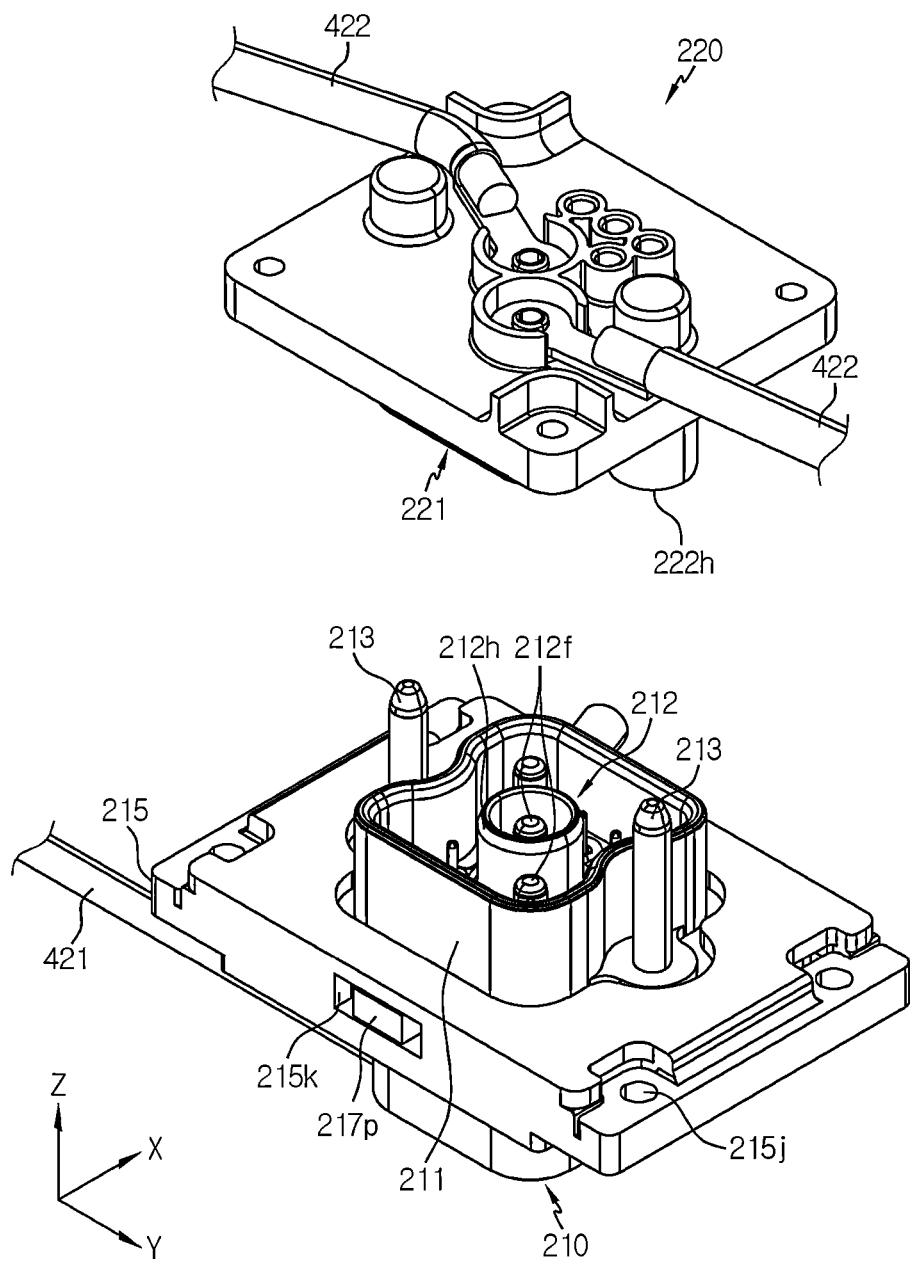
FIG. 3 is a schematic perspective view of a connector module and an external connector module according to an embodiment of the present disclosure.
Figure 4:
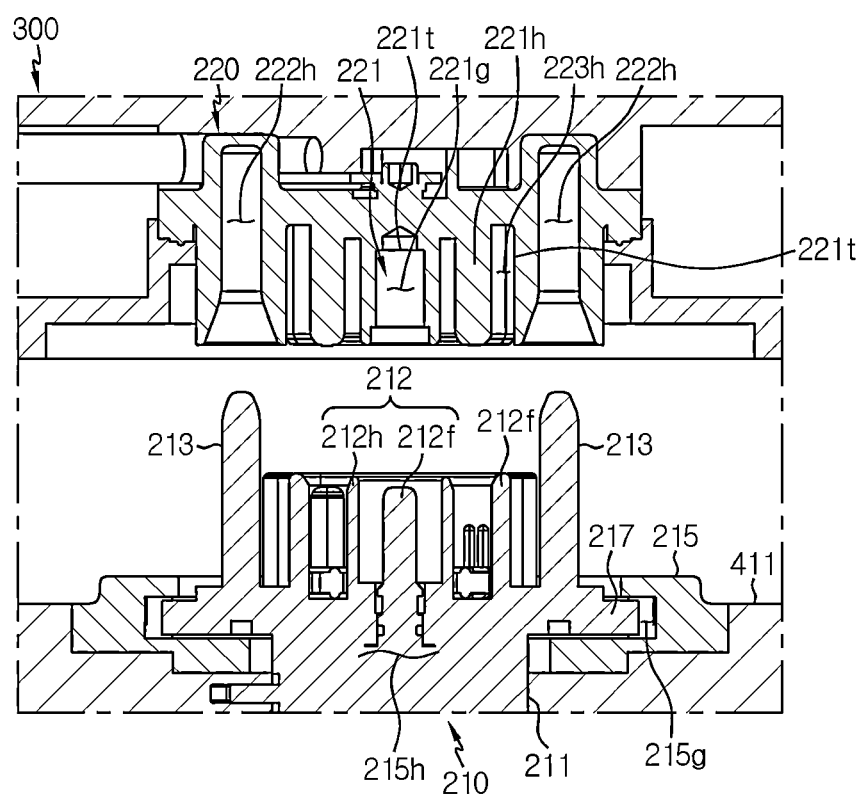
FIG. 4 is a schematic exploded cross-sectional view of a connector module and a battery pack according to an embodiment of the present disclosure.
Figure 5:
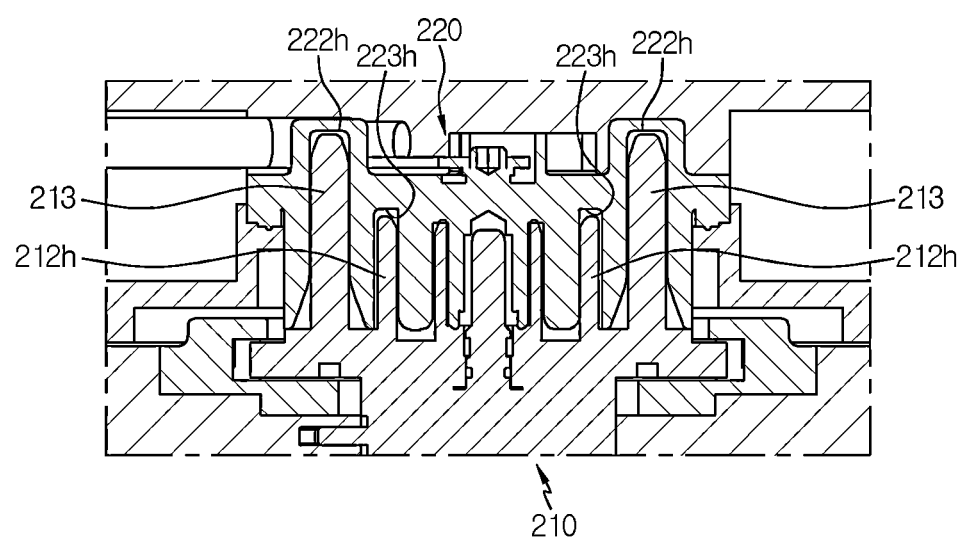
FIG. 5 is a schematic partial cross-sectional view of the connector module and the battery pack of FIG. 1 taken along the line C-C'.

FIG. 1 is a schematic bottom perspective view of an external connector module and a battery pack according to an embodiment of the present disclosure. FIG. 2 is a schematic exploded perspective view of a connector module and the battery pack according to an embodiment of the present disclosure. FIG. 3 is a schematic perspective view of the connector module and the external connector module according to an embodiment of the present disclosure. FIG. 4 is a schematic exploded cross-sectional view of the connector module and the battery pack according to an embodiment of the present disclosure. Additionally, FIG. 5 is a schematic partial cross-sectional view of the connector module and the battery pack of FIG. 1 taken along the line C-C'. For reference, in FIG. 1, the front-rear direction is set to an X-axis direction, the left-right direction to a Y-axis direction, and the up-down direction a Z-axis direction.

Referring to FIGS. 1 to 5, the connector module 210 according to an embodiment of the present disclosure is configured to be connected to the external connector module 220. Here, the external connector module 220 includes at least one receptacle 221 and a receiving groove 222h having an inner space of a predetermined depth.

In detail, the connector module 210 may be provided in an internal device as one configuration. For example, the internal device may be a vehicle (400 in FIG. 11), an electronic device, a computer or a battery pack 300.

Additionally, the connector module 210 includes at least one plug 212, a coupling part 211 and a fastening part 215. In more detail, the plug 212 may have at least one pin 212f made of metal to be electrically connected to the receptacle 221. The pin 212f may be electrically connected to a coaxial cable 421. Additionally, the plug 212 may include a plug housing 212h in which the pin 212f is received.

Furthermore, the receptacle 221 may include at least one terminal 221t connected to another coaxial cable 422, a connection groove 221g received in the terminal 221t, and a receptacle housing 221h in which the terminal 221t is received.

Additionally, a fitting groove 223h may have at least one terminal 221t. The terminal 221t may be a conductive metal extending along the inner surface of the fitting groove 223h. The terminal 221t may be configured to contact the pin 212f.

Additionally, the plug 212 may be configured to be coupled to the receptacle 221. For example, the pin 212f of the plug 212 may be configured to be inserted and fixed in the connection groove 221g of the receptacle 221.

Further, the coupling part 211 of the connector module 210 may include a plurality of coupling guide ribs 213 configured to guide the coupling of the plug 212 with the receptacle 221 of the external connector module 220. In detail, the coupling guide rib 213 may be configured to guide the coupling position of the connector module 210. The coupling guide rib 213 may extend toward the external connector module 220. When the external connector module 220 is connected to the connector module 210, the coupling guide rib 213 may be configured to be inserted into the receiving groove 222h. That is, the coupling guide rib 213 may be inserted into the receiving groove 222h of the external connector module 220 to guide an operator to insert the connector module 210 into the external connector module 220 at the exact position.

Additionally, a portion of the fastening part 215 may be fixed to the internal device. For example, the fastening part 215 may have a block shape to be coupled to a panel 411 of the vehicle (see 400 in FIG. 11). The fastening part 215 may have at least one bolt groove 215j configured to be fixed to the panel 411 using a bolt (not shown).

Furthermore, the fastening part 215 may be coupled to the coupling part 211 such that the coupling part 211 can move in a predetermined distance range. For example, the fastening part 215 may have an inner space in which the coupling part 211 can move when the coupling part 211 are coupled to the fastening part 215. That is, the volume of the inner space of the fastening part 215 may be larger by a predetermined amount than the volume occupied by a portion of the coupling part 211.

According to this configuration of the present disclosure, the present disclosure includes the fastening part 215 which is coupled to the coupling part 211 such that the coupling part 211 can move in the predetermined distance range and is configured such that a portion is fixed to the internal device, thereby preventing damage that occurs to the connector module 210, the internal device, or the external device when the connector module 210 is not placed in the exact position for smooth coupling during the assembly of the connector modules 210, 220.

That is, when the coupling guide rib 213 of the connector module 210 is not disposed on a line perpendicular to the receiving groove 222h of the external connector module 220, the coupling guide rib 213 collides with the receptacle 221 of the external connector module 220, causing damage to the receptacle 221. However, the connector module 210 of the present disclosure is configured such that the coupling part 211 is coupled to the fastening part 215 moveably in the predetermined distance range, so when the coupling guide rib 213 deviates from the exact position perpendicular to the central axis of the receiving groove 222h, the coupling guide rib 213 collides with the outer periphery of the receiving groove 222h and the collision force moves the coupling part 211 to the exact position. Accordingly, it is possible to effectively reduce damage to the connector module 210.

Figure 6:
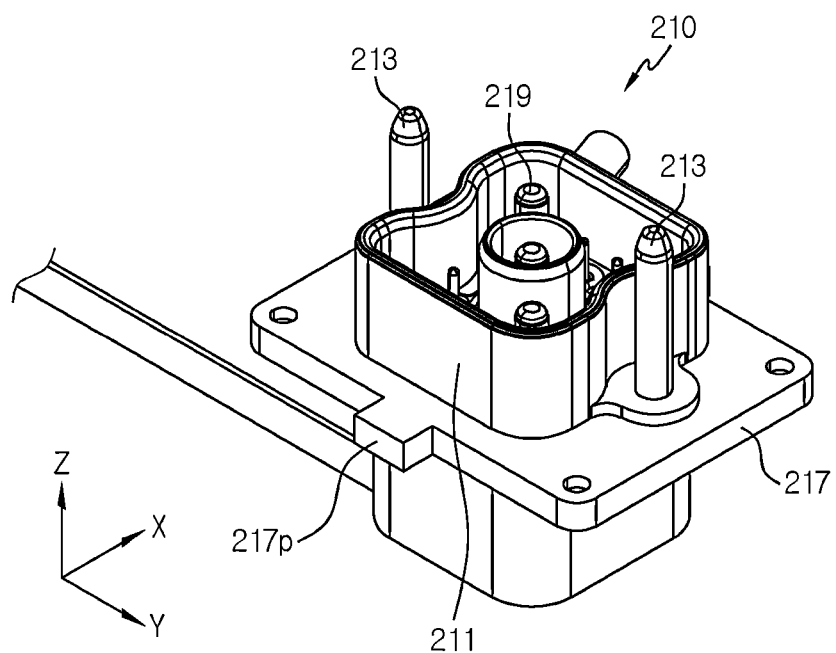
FIG. 6 is a schematic perspective view of some elements of a connector module according to an embodiment of the present disclosure.

FIG. 6 is a schematic perspective view of some elements of the connector module according to an embodiment of the present disclosure. Here, in the connector module of FIG. 6, the fastening part 215 is omitted for description of the drawing.

Referring to FIG. 6 together with FIGS. 3 and 4, the connector module 210 may include a block part 217. The block part 217 may be in the shape of a block that horizontally extends from the plug 212 and the coupling part 211. The block part 217 may be configured to be inserted into the inner space of the fastening part 215. The block part 217 may be configured to be spaced apart a predetermined distance from the horizontal inner surface of the inner space of the fastening part 215.

In detail, as shown in FIG. 4, the fastening part 215 may include a mounting hole 215h, and an insertion groove 215g formed in the mounting hole 215h. In detail, the mounting hole 215h may be configured to allow the plug 212 to be inserted therein and pass therethrough. For example, the mounting hole 215*h* of the fastening part 215 may be vertically open at the center of a block that horizontally extends.

Furthermore, the insertion groove 215*g* may be configured such that a portion of the block part 217 is inserted into the insertion groove 215*g*. That is, the inner space of the insertion groove 215*g* may have a sufficient volume for a portion of the block part 217 to be inserted. Additionally, the insertion groove 215*g* may have a clearance allowed for the block part 217 to move in the predetermined distance range. That is, the insertion groove 215*g* may be configured such that the inner surface may be spaced apart the predetermined distance from the horizontal end of the block part 217. The block part 217 may move such that the horizontal end comes into contact with the inner surface of the insertion groove 215*g*.

According to this configuration of the present disclosure, the connector module 210 of the present disclosure includes the block part 217 horizontally extending from the plug 212 and the coupling part 211, and the fastening part 215 includes the mounting hole 215*h* through which the plug 212 is inserted and passes, and the insertion groove 215*g* formed in the mounting hole 215*h* and having the clearance allowed for the block part 217 to move in the predetermined distance range when a portion of the block part 217 is inserted into the insertion groove 215*g*, thereby preventing damage that occurs to the connector module 210, the internal device, or the external device when the connector module 210 is not placed in the exact position for smooth coupling during the assembly of the connector modules 210, 220.

That is, in the connector module 210 of the present disclosure, the block part 217 may move in the predetermined distance range within the inner space of the insertion groove 215*g* formed in the fastening part 215, so when the coupling guide rib 213 deviates from the exact position perpendicular to the central axis of the receiving groove 222*h*, the coupling guide rib 213 collides with the outer periphery of the receiving groove 222*h* and the collision force moves the block part 217 to place the coupling guide rib 213 in the exact position.

Referring to FIG. 6 together with FIG. 3, the connector module 210 of the present disclosure may have a movement protrusion 217*p* that extends outwardly from the block part 217. For example, as shown in FIG. 6, the movement protrusion 217*p* may be formed at each of the front and rear sides of the block part 217.

Additionally, the fastening part 215 may have a guide hole 215*k* at a corresponding location to the movement protrusion 217*p*. The guide hole 215*k* may be configured to limit the movement range in which the block part 217 moves in two directions. That is, the guide hole 215*k* may be configured to allow the movement protrusion 217*p* to horizontally move when the movement protrusion 217*p* is inserted into the guide hole 215*k*. In other words, the guide hole 215*k* may have a larger hole size than the movement protrusion 217*p*.

According to this configuration of the present disclosure, the present disclosure includes the block part 217 having the movement protrusion 217*p* extending outwardly and the fastening part 215 having the guide hole 215*k* configured to allow the movement protrusion 217*p* to horizontally move when the movement protrusion 217*p* is inserted into the guide hole 215*k*, thereby precisely limiting the movement range in which the block part 217 moves in two directions. Accordingly, the present disclosure may prevent damage that occurs to the connector module 210, the internal device, or the external device when the connector module 210 is not placed in the exact position for smooth coupling during the assembly of the connector modules 210, 220.

Figure 7:
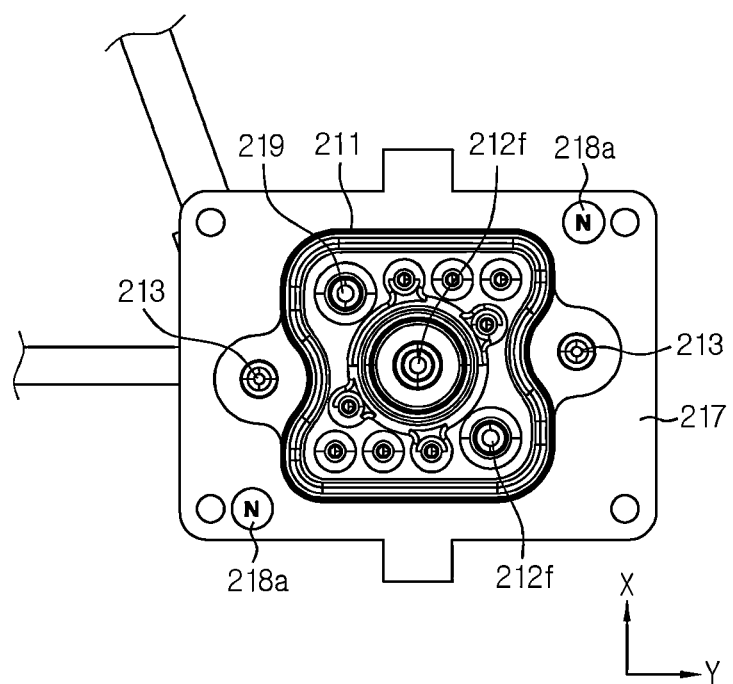
FIG. 7 is a schematic plan view of some elements of a connector module according to another embodiment of the present disclosure.
Figure 8:
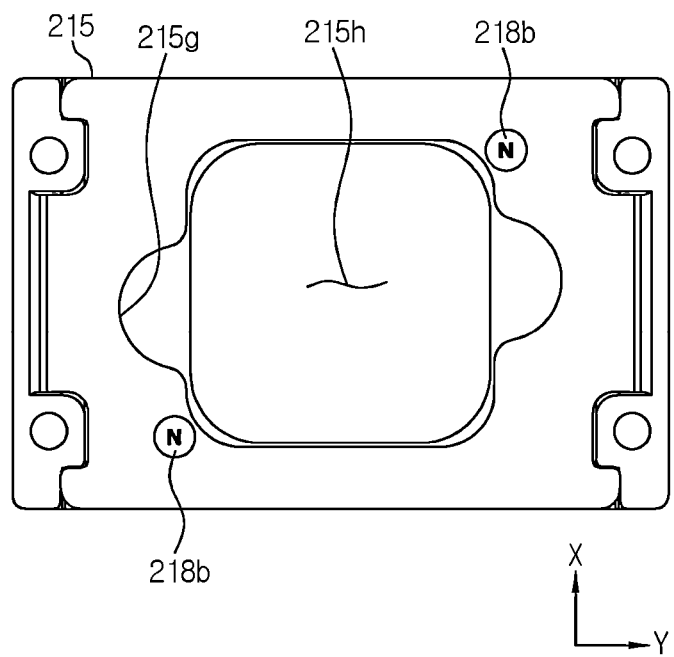
FIG. 8 is a schematic plan view of the remaining elements of a connector module according to another embodiment of the present disclosure.

FIG. 7 is a schematic plan view of some elements of a connector module according to another embodiment of the present disclosure. FIG. 8 is a schematic plan view of the remaining elements of the connector module according to another embodiment of the present disclosure. Additionally, FIG. 9 is a schematic cross-sectional view of the connector module according to another embodiment of the present disclosure.

Figure 9:
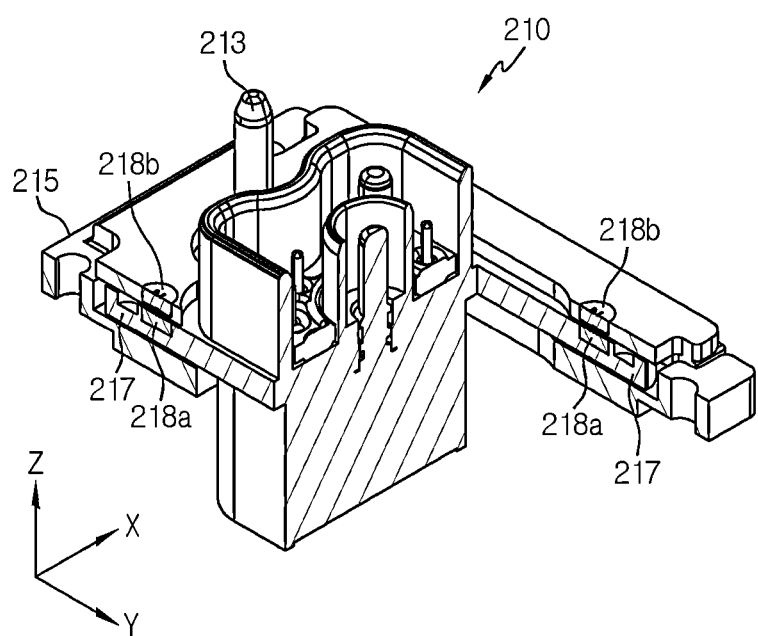
FIG. 9 is a schematic cross-sectional view of a connector module according to another embodiment of the present disclosure.

Referring to FIGS. 7 to 9, the connector module 210 may include a first magnet 218*a* and a second magnet 218*b*. In detail, the first magnet 218*a* may be provided at a portion of the block part 217. For example, as shown in FIG. 7, two first magnets 218*a* may be disposed on the outer periphery of the block part 217. The two first magnets 218*a* may be disposed in the diagonal direction.

Additionally, the second magnet 218*b* may be configured to attract the first magnet 218*a* to move the coupling guide rib 213 to the exact position. The second magnet 218*b* may be disposed at a portion of the fastening part 215. When the second magnet 218*b* contacts the first magnet 218*a*, the coupling guide rib 213 of the coupling part 211 may be disposed at a location perpendicular to the central axis of the receiving groove 222*h* of the external connector module 220. For example, as shown in FIG. 8, two second magnets 218*b* may be disposed at the periphery of the mounting hole 215*h* of the fastening part 215. The two second magnets 218*b* may be disposed in the diagonal direction from each other.

Furthermore, the second magnet 218*b* may be positioned to generate a force that attracts the first magnet 218*a*. For example, the S pole of the second magnet 218*b* may be positioned opposite the N pole of the first magnet 218*a*. On the contrary, the N pole of the second magnet 218*b* may be positioned opposite the S pole of the first magnet 218*a*.

According to this configuration of the present disclosure, the connector module 210 of the present disclosure includes the first magnet 218*a* provided in a portion of the block part 217, and the second magnet 218*b* configured to attract the first magnet 218*a* to move the coupling guide rib 213 to the exact position and disposed at a portion of the fastening part 215, thereby moving the coupling guide rib 213 to the exact position in a straightforward manner by a force of attraction between the first magnet 218*a* and the second magnet 218*b*.

That is, when the coupling guide rib 213 deviates from the exact position perpendicular to the central axis of the receiving groove 222*h*, the coupling guide rib 213 collides with the outer periphery of the receiving groove 222*h*, and the block part 217 may be moved by the collision force, and the coupling guide rib 213 may be temporarily fixed to the exact position by the force of attraction between the first magnet 218*a* and the second magnet 218*b*.

Additionally, when the block part 217 is disposed in close contact with the inner surface in the insertion groove 215*g*, it may be difficult to move the position of the block part 217 to the exact position only by collision between the coupling guide rib 213 and the outer periphery of the receiving groove 222*h*. Accordingly, the present disclosure may prevent the block part 217 from coming into close contact with the inner surface in the insertion groove 215*g* in normal condition using the first magnet 218*a* and the second magnet 218*b*, thereby reducing damage occurring when the connector module 210 is not placed in position during the assembly of the connector modules 210, 220.

Figure 10:
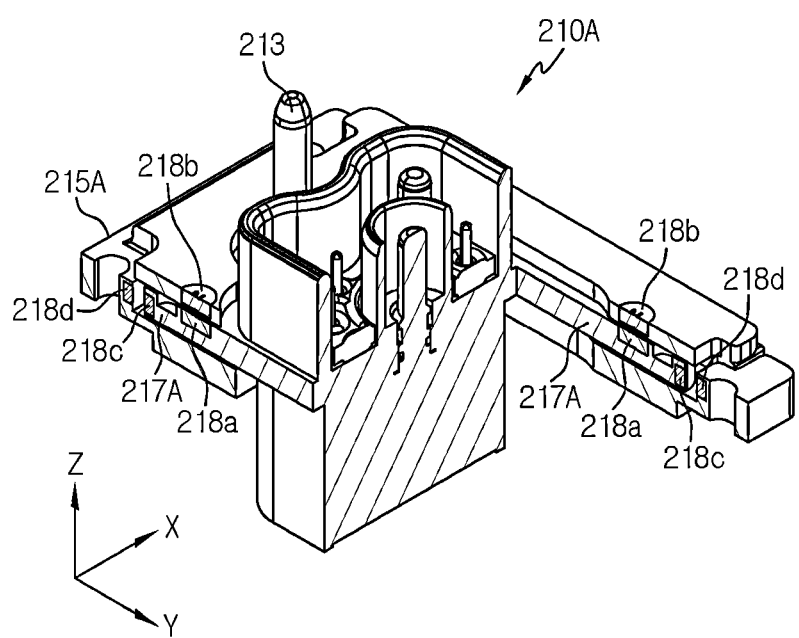
FIG. 10 is a schematic cross-sectional view of a connector module according to still another embodiment of the present disclosure.

FIG. 10 is a schematic cross-sectional view of a connector module according to still another embodiment of the present disclosure.

Referring to FIG. 10, when compared with the connector module 210 of FIG. 9, the connector module 210A of FIG. 10 may further include a third magnet 218c and a fourth magnet 218d.

In detail, as opposed to the block part 217 of FIG. 9, the block part 217A of FIG. 10 may include the third magnet 218c embedded in at least a portion thereof. For example, the connector module 210A may include the third magnet 218c at the horizontal (X-axis direction and Y-axis direction) end of the block part 217A. For example, as shown in FIG. 10, two third magnets 218c may be embedded and disposed at the left and right ends of the block part 217A.

Additionally, as opposed to the fastening part 215A of FIG. 9, the fastening part 215A of FIG. 10 may include the fourth magnet 218d embedded in at least a portion thereof. The connector module 210A may include the fourth magnet 218d in the insertion groove 215g of the fastening part 215A. That is, the fourth magnet 218d may be configured to be disposed opposite the third magnet 218c. For example, as shown in FIG. 10, two fourth magnets 218d may be embedded and disposed in the inner surface of the insertion groove 215g of the fastening part 215A. The two magnets may be disposed opposite the two third magnets 218c.

The fourth magnet 218d may be positioned to act a force that pushes the third magnet 218c. For example, the S pole of the fourth magnet 218d may be positioned opposite the S pole of the third magnet 218c. On the contrary, the N pole of the fourth magnet 218d may be positioned opposite the N pole of the third magnet 218c.

That is, the connector module 210A of the present disclosure may be configured such that the block part 217A is spaced apart the predetermined distance from the inner surface of the insertion groove 215g to place the coupling guide rib 213 in the exact position perpendicular to the central axis of the receiving groove 222h using the third magnet 218c and the fourth magnet 218d.

According to this configuration of the present disclosure, the present disclosure includes the third magnet 218c at the horizontal end of the block part 217A and the fourth magnet 218d configured to act a force that pushes the third magnet 218c at the insertion groove 215g of the fastening part 215A, thereby preventing the block part 217A from coming into close contact with the inner surface in the insertion groove 215g in normal condition using the third magnet 218c and the fourth magnet 218d. Accordingly, it is possible to reduce damage occurring when the connector module 210A is not placed in position during the assembly of the connector modules 210, 220.

Referring back to FIGS. 3 to 7, the connector module 210 of the present disclosure may include a connection guide rib (219 in FIG. 6). The connection guide rib 219 may be disposed in the plug housing 212h. The connection guide rib 219 may guide the insertion of the at least one plug 212 into the exact position when the at least one plug 212 is connected to the plurality of receptacles 221.

For example, as shown in FIGS. 4 and 5, the connection guide rib 219 may guide the insertion of the power pin 212f configured to output the power or receive the power into the receptacle 221 of the external connector module 220 without interference.

According to this configuration of the present disclosure, the connector module 210 includes the connection guide rib 219 extending in the coupling direction to guide the insertion of the at least one plug 212 into the exact position when the at least one plug 212 is connected to the plurality of receptacles 221, thereby preventing collision from occurring during the insertion of the pin 212f of the plug 212 into the receptacle 221. Accordingly, it is possible to improve the durability of the connector module 210 of the present disclosure.

Referring back to FIGS. 3 to 7, the connector module 210 of the present disclosure may include the fitting groove 223h having an internal structure corresponding to the plug housing 212h. The fitting groove 223h may be configured to allow a portion of the plug housing 212h to be inserted. For example, as shown in FIGS. 4 and 5, the external connector module 220 may include the fitting groove 223h having the inner space into which a portion of the plug housing 212h is inserted. The fitting groove 223h may have a curved linear shape corresponding to the curved planar shape of the plug housing 212h.

According to this configuration of the present disclosure, the present disclosure includes the fitting groove 223h having an internal structure corresponding to the plug housing 212h to insert a portion of the plug housing 212h into the external connector module 220, and thus the plug 212 and the receptacle 221 may be stably coupled by inserting the plug housing 212h into the fitting groove 223h of the external connector module 220. Accordingly, the connector module 210 of the present disclosure may effectively reduce damage to the plug 212 and the receptacle 221 in the coupling with the external connector module 220.

Referring back to FIGS. 1 and 2, the battery pack 300 according to an embodiment of the present disclosure includes the connector module 210 or the external connector module 220, a battery management system (not shown) electrically connected to the connector module 210 or the external connector module 220, a plurality of secondary batteries (not shown), and a pack case 310 configured to receive the plurality of secondary batteries therein.

In detail, the battery management system may have various types of devices to control the charge/discharge of the plurality of secondary batteries. The device may be, for example, a current sensor, a fuse or the like. The battery management system and the external connector module 220 may be electrically connected through the coaxial cable 422.

Additionally, the secondary battery may be, for example, a can type secondary battery. Additionally, the secondary battery may include an electrode assembly and an electrolyte received in a can. The configuration of the secondary battery is well known to those skilled in the art at the filing the patent application, and its detailed description is omitted herein. The battery pack 300 according to the present disclosure is not limited to a configuration of a particular type of secondary battery. That is, various types of secondary batteries known at the time of filing the present disclosure may be employed for the battery pack 300 according to the present disclosure.

Furthermore, the pack case 310 may have outer walls. According to this configuration of the present disclosure, the pack case 310 having the outer walls may effectively protect the plurality of secondary batteries received therein from external impacts.

Additionally, a portion of the external connector module 220 may be embedded and disposed at the bottom of the pack case 310. On the contrary, a portion of the connector module 210 connected to the external connector module 220 may be embedded and disposed at the bottom of the pack case 310.

Figure 11:
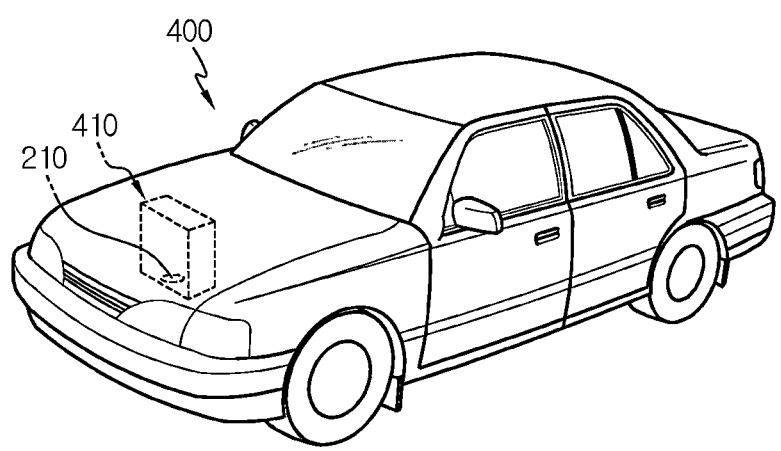
FIG. 11 is a schematic diagram of a vehicle according to an embodiment of the present disclosure.

FIG. 11 is a schematic diagram of a vehicle according to an embodiment of the present disclosure.

Referring to FIG. 11 together with FIGS. 1, 4 and 5, the vehicle 400 according to an embodiment of the present disclosure may include the battery pack 300, and a mounting part 410 to receive the battery pack 300. In detail, the mounting part 410 may have a receiving space in which the battery pack 300 is inserted and received. That is, the receiving space of the mounting part 410 may be formed with a structure corresponding to the shape of the battery pack 300. The connector module 210 may be embedded in the mounting part 410. For example, as shown in FIGS. 4 and 5, a portion of the connector module 210 may be embedded in the panel 411 of the vehicle 400. The external connector module 220 disposed at the bottom of the battery pack 300 may move down and be coupled to the connector module 210.

According to this configuration of the present disclosure, the vehicle 400 of the present disclosure includes the battery pack 300, and the mounting part 410 having the receiving space in which the battery pack 300 is inserted and received and including the connector module 210 in the receiving space, and the external connector module 220 is provided at the end of the pack case 310 in the insertion direction of the battery pack 300, thereby solving the problem that the operator cannot see the external connector module 220 of the battery pack 300 and fails to smoothly couple to the connector module 210.

That is, the vehicle 400 of the present disclosure includes the fastening part 215 coupled to the coupling part 211 such that the coupling part 211 of the connector module 210 moves in the predetermined distance range, thereby preventing damage that occurs to the connector module 210, the internal device, or the external device when the connector module 210 is not placed in the exact position for smooth coupling during the assembly of the connector modules 210, 220.

Referring back to FIGS. 1, 2, 4 and 5, the connector assembly according to an embodiment of the present disclosure includes the external connector module 220 provided in the external device, and the internal connector module 210 provided in the internal device. The internal connector module 210 may be configured to be connected to the external connector module 220.

In detail, the internal connector module 210 may include the at least one plug 212, the coupling part 211, and the fastening part 215. The at least one plug 212 may be configured to be coupled to the receptacle 221 for electrical connection with the receptacle 221.

The coupling part 211 may include the coupling guide rib 213 that extends to guide the movement of the internal connector module 210 to the exact position for coupling with the external connector module 220 when the internal connector module 210 is connected to the external connector module 220.

The fastening part 215 may be configured to be coupled to the coupling part 211 such that the coupling part 211 can move in the predetermined distance range, and a portion of the fastening part 215 is fixed to the panel of the external device.

The external connector module 220 may include at least one receptacle 221, and the receiving groove 222h. The receptacle 221 may be configured to be coupled to each of the at least one plug 212.

The receiving groove 222h may be received in a manner that the coupling guide rib 213 is inserted, and the receiving groove 222h may have a corresponding shape to the coupling guide rib 213.

According to this configuration of the present disclosure, the connector assembly of the present disclosure may achieve smooth coupling between the external connector module 220 and the internal connector module 210 respectively provided in the external device and the internal device. Accordingly, it is possible to prevent damage that occurs to the connector module 210, the internal device, or the external device when the connector module 210 is not placed in the exact position for smooth coupling during the assembly of the connector modules 210, 220.

The terms indicating directions as used herein such as upper, lower, left, exact, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

[Description of Reference Numerals]

210: Connector module
211: Coupling part
212: Plug
212f, 212h: Pin, Plug housing
213: Coupling guide rib
215: Fastening part
215h, 215g: Mount hole, Insertion groove
215k: Guide hole
217: Block part
217p: Movement protrusion
218a, 218b, 218c, 218d: First magnet, Second magnet, Third magnet, Fourth magnet
219: Connection guide rib
220: External connector module
221: Receptacle
221t, 221h: Terminal, Receptacle housing
222h: Receiving groove
223h: Fitting groove
300: Battery pack
310: Pack case
400: Vehicle
410: Mounting part

What is claimed is:

1. A connector module provided in an internal device and configured to be connected to at least one receptacle of an external connector module provided in an external device, the connector module comprising:
   at least one plug configured to be coupled to the receptacle for electrical connection with the receptacle;
   a coupler including:
      a main body,
      a coupling guide rib that extends from the main body in a vertical direction toward the external connector module the coupling guide rib being configured to be inserted into a receiving groove of the external connector module when the external connector module is connected to the connector module, the coupling guide rib being configured to guide a coupling position of the connector module,
      a block part that horizontally extends outwardly from the main body, and
      a movement protrusion extending outwardly in a first horizontal direction from a portion of one side of the block part, the movement protrusion having a width in a second horizonal direction less than a width of the block part in the second horizontal direction; and a fastener coupled to the coupler such that the coupler is configured to move in a predetermined distance range and configured such that a portion of the fastener is fixed to the internal device, the fastener including a mounting hole through which the plug is inserted and passes, an insertion groove in which the block part is inserted, and a guide hole formed in the mounting hole to extend in the first horizontal direction, wherein the movement protrusion is inserted into the guide hole, wherein the guide hole has a width in the second horizontal direction greater than a width of the movement protrusion but less than a width of the block part, wherein the guide hole extends in the first horizontal direction from the insertion groove to an outer peripheral surface of the fastener, and wherein the fastener is configured to allow the coupler to horizontally move in the first and second horizontal directions relative to the fastener.

2. The connector module according to claim 1, wherein the connector module comprises:

a first magnet disposed at a portion of the block part; and a second magnet configured to attract the first magnet to move the coupling guide rib to an exact position and disposed at a portion of the fastener.

3. The connector module according to claim 2, wherein the connector module further comprises:

a third magnet disposed at a horizontal end of the block part; and a fourth magnet disposed at the insertion groove of the fastener to act a pushing force on the third magnet.

4. The connector module according to claim 1, further comprising a connection guide rib that extends in a coupling direction to guide insertion of the at least one plug into position when the at least one plug is connected to the receptacle.

5. The connector module according to claim 1, wherein the at least one plug includes at least one pin connected with a coaxial cable, and a plug housing in which the pin is received.

6. A battery pack comprising the connector module according to claim 1, a battery management system electrically connected to the connector module, a plurality of secondary batteries, and a pack case configured to receive the plurality of secondary batteries therein.

7. A vehicle comprising:

the battery pack according to claim 6; and a mounting part having a receiving space in which the battery pack is inserted and received, wherein the connector module is provided in the receiving space, wherein the external connector module is provided at an end of the pack case in an insertion direction of the battery pack.

8. The connector module according to claim 1, where in the insertion groove defines a pocket in which the block part is inserted such that the insertion groove surrounds an end portion of the block part in an upward direction, a downward direction, and the first horizontal direction.

* * * * *